(12) United States Patent
Ivarsson et al.

(10) Patent No.: US 11,541,686 B2
(45) Date of Patent: Jan. 3, 2023

(54) WHEEL LOCKING DEVICE

(71) Applicant: Rimgard Sweden AB, Solna (SE)

(72) Inventors: Lars Ivarsson, Stockholm (SE); Marcus Ekström, Hägersten (SE)

(73) Assignee: Rimgard Sweden AB, Solna (SE)

( * ) Notice: Subject to any disclaimer, the term of this patent is extended or adjusted under 35 U.S.C. 154(b) by 524 days.

(21) Appl. No.: 16/701,321

(22) Filed: Dec. 3, 2019

(65) Prior Publication Data

US 2021/0162803 A1    Jun. 3, 2021

(51) Int. Cl.
*B60B 7/16* (2006.01)
*B60B 3/16* (2006.01)

(52) U.S. Cl.
CPC ...... *B60B 3/165* (2013.01); *B60B 2900/3318* (2013.01)

(58) Field of Classification Search
CPC ......... E05B 73/00; E05B 77/44; B60R 25/00; B60R 25/01; B60R 25/02; Y10T 70/5836;
(Continued)

(56) References Cited

U.S. PATENT DOCUMENTS 2,807,157 A    9/1957 McLin
3,833,266 A    9/1974 Lamme
(Continued)

FOREIGN PATENT DOCUMENTS

CN    2803830 Y    8/2006
CN    104228453 A    12/2014
(Continued)

OTHER PUBLICATIONS

International Search Report and Written Opinion dated Mar. 4, 2021, from International Application No. PCT/US2020/062917, 11 pages.
(Continued)

*Primary Examiner* — Suzanne L Barrett
(74) *Attorney, Agent, or Firm* — Meunier Carlin & Curfman LLC

(57) ABSTRACT

A device for locking the wheel of a vehicle. The device comprises a main module adapted to be attached to the wheel and configured to cover nuts or bolts for attaching the wheel to the vehicle. The device further comprises an insert structure comprising an upper part and a lower part wherein the upper part is rotatably joined to the lower part by an axial joint. The insert structure is further transferable from an open position to a closed position upon rotation of said upper part around said axial joint wherein the insert structure in said open position is adapted for insertion in the wheel concentrically to the axis of rotation of the wheel and wherein the insert structure in said closed position is adapted for fixating the insert structure in said wheel upon transfer to the closed position after insertion in the wheel. The device further comprises a center bolt adapted to be connected through the main module to the lower part of the insert structure by means of a threading as well as a locking mechanism adapted to be arranged in a locking state in which the locking mechanism prevents the center bolt from rotating relative the main module, and in an open state in which the locking mechanism allows the center bolt to rotate relative the main module.

15 Claims, 5 Drawing Sheets

(58) Field of Classification Search
CPC ....... Y10T 70/5841; B60B 7/16; B60B 7/165; B60B 2900/3318; B60B 3/165
USPC .......................................... 70/225, 226, 237
See application file for complete search history.

(56) References Cited

U.S. PATENT DOCUMENTS

| | | |
|---|---|---|
| 8,739,585 B2 | 6/2014 | Sims |
| 8,943,865 B1 | 2/2015 | Bullock et al. |
| 9,689,180 B2 | 6/2017 | Ivarsson |
| 10,486,461 B1 | 11/2019 | Ivarsson et al. |
| 2017/0232786 A1 | 8/2017 | Hickey et al. |
| 2018/0126778 A1 | 5/2018 | Fisher |
| 2018/0186179 A1* | 7/2018 | Chen ....................... B60B 3/142 |
| 2019/0344619 A1 | 11/2019 | Price |
| 2021/0162802 A1* | 6/2021 | Ivarsson ................. B60B 3/165 |
| 2022/0144012 A1* | 5/2022 | Ivarsson ................. B60B 3/165 |

FOREIGN PATENT DOCUMENTS

| | | | |
|---|---|---|---|
| CN | 106626965 A | 5/2017 | |
| DE | 3233918 A1 | 3/1984 | |
| WO | WO-2021113380 A1 * | 6/2021 | ............. B60B 3/165 |
| WO | WO-2021113386 A1 * | 6/2021 | ............. B60B 3/165 |
| WO | WO-2021252992 A1 * | 12/2021 | ........... B60B 7/0013 |

OTHER PUBLICATIONS

Search report of Swedish patent application No. 1951376-1, dated May 26, 2020, 2 pages.
Search report of Swedish patent application No. 1951377-9, dated May 26, 2020, 2 pages.

* cited by examiner

WHEEL LOCKING DEVICE

TECHNICAL FIELD

The present inventive concept relates to a technology for preventing unauthorized removal of vehicle wheels. More specifically, the present inventive concept relates to a universal comprehensive locking system for car wheels is disclosed.

BACKGROUND

Unauthorized removal of car parts, specifically alloy wheels, is a frequently occurring problem all over the world. Due to their high value, custom wheels and tire rims are examples of items frequently stolen. Accordingly, there is a great need for devices and techniques for protecting wheels from unauthorized removal.

There have been attempts to provide such protection. For example, U.S. Pat. Nos. 8,739,585 and 8,943,865 disclose antitheft devices for car wheels. These devices can be removed relatively easily by an experienced thief and thus do not provide a truly reliable wheel lock. U.S. Pat. No. 9,689,180 issued to the inventor of this application provides a device that provides secure wheel lock. However, considering the great variety of car makes and models all over the world, there is a need for an improved wheel lock system that fits, without substantial adjustments, to most car wheels.

SUMMARY

In view of the above, an object of the present inventive concept is to provide a technology that addresses at least some of the above concerns. This and other objects, which will become apparent in the following, are accomplished by a device as defined in the independent claim. Preferable embodiments are defined in the dependent claims.

Hence, according to a first aspect of the present inventive concept, there is provided a device for locking the wheel of a vehicle. The device comprises a main module adapted to be attached to the wheel and configured to cover nuts or bolts for attaching the wheel to the vehicle. The device further comprises an insert structure comprising an upper part and a lower part wherein the upper part is rotatably joined to the lower part by an axial joint. The insert structure is further transferable from an open position to a closed position upon rotation of said upper part around said axial joint wherein the insert structure in said open position is adapted for insertion in the wheel concentrically to the axis of rotation of the wheel and wherein the insert structure in said closed position is adapted for fixating the insert structure in said wheel upon transfer to the closed position after insertion in the wheel. The device further comprises a center bolt adapted to be connected through the main module to the lower part of the insert structure by means of a threading as well as a locking mechanism adapted to be arranged in a locking state in which the locking mechanism prevents the center bolt from rotating relative the main module, and in an open state in which the locking mechanism allows the center bolt to rotate relative the main module.

The main module may comprise 200 or blocking means adapted to restrict, limit or block access to the bolt heads and/or lug nuts, thereby hindering or at least making it harder for an unauthorized person to undo the bolts/lug nuts and remove the wheel. The protective elements may form an integral part of the main module, or be attached as separate items to the same, and may preferably be arranged in a pattern corresponding to the position of the bolts/nuts of the wheel.

The insert structure is arranged to secure the device to the wheel, this may be achieved by inserting the insert structure in the wheel hub whilst in an open position to further securely fix the insert structure in the wheel hub by transferring it to the closed position. In the closed position the insert structure exerts a force on the inner walls of the wheel hub, preventing it from releasing from the wheel even when sustaining significant force in the axial direction of the wheel. By the term "wheel hub" it is here meant a cylindrical hallow central portion of a vehicle wheel concentric to the axis of rotation of said wheel. By the term "inner walls of the wheel hub" it is here meant the inner surface(s) of the wheel hub. Moreover, the insert structure may be of, but not limited to, a circular or round shape allowing it to be more adaptable to vehicle wheel hubs.

The insert structure is further advantageous in that it allows the device to be installed on the wheel of a vehicle without requiring the removal of said wheel from the vehicle for the installation, thus resulting in an improvement of the user utilization. Furthermore, by having the upper part joined to the lower part by the axial joint, the insert structure further reduces to only the insert structure the amount of components required to fix the device to the wheel of the vehicle which in turn results in a reduction of the complexity of the device.

The center bolt comprised in the device may be threaded directly in its material and joined to the insert structure via a corresponding thread directly threaded in the material of the lower part of the insert structure. The corresponding threads may be oriented such that the center bolt, upon rotation, moves along the axis of rotation of the wheel. The rotation may for example be achieved by means of a key or a wrench fitting with the center bolt or by means of human force. When the main module has been installed and secured, for example by tightening the center bolt as described above, the locking mechanism may be brought into its locking state to prevent an unauthorized entity from removing the locking means and thereby accessing the nuts/bolts of the wheel. The locking mechanism may be configured to prevent the center bolt from being turned or rotated in the main module. This may be achieved in a number of ways, some of which being discussed in further detail in connection with the detailed description of the drawings. In one example, the locking mechanism may comprise a locking bolt that can be fixed to the center bolt and to the main module to prevent rotational movement between the two. The locking bolt of the locking mechanism may for example have a flat side that engages with a corresponding surface in the center bolt and the main module to keep the locking bolt from rotating. The locking mechanism may, in the locking state, be axially secured to for example the wheel by means of a washer configured to engage with a backside of the main module or by engagement of corresponding recesses and protrusions between the locking bolt and the center bolt. To bring the locking mechanism in the open state, the washer or corresponding recesses and protrusions may be rotated such that it/they can be released from engagement with the main module or center bolt and the locking bolt removed from the center bolt.

The locking mechanism may in some examples be a key operated lock, such as e.g. the Assa Desmo+ or Abloy cam lock.

According to an embodiment, the upper part of the insert structure may comprise an inferior surface and the lower part of the insert structure may comprise a superior surface such that the inferior surface abuts the superior surface when the insert structure is in the closed position. The present embodiment is advantageous in that the abutment of the inferior surface on the superior surface acts as a delimiter of the maximum rotation of the upper part relative to the lower part about the axial joint when the insert structure is transferred to the closed position. The aforementioned delimitation provided by the abutment of the inferior surface on the superior surface allows for both the upper part and the lower part to be in a plane perpendicular to the rotational axis of the wheel of the vehicle when the insert structure is in the closed position.

According to an embodiment, the upper part of the insert structure may form an angle with the lower part of the insert structure when said insert structure is in the open position. The angle formed between the upper part and the lower part may be directly proportional to the rotation of the upper part relative to the lower part about the axial joint. The present embodiment is advantageous in that it allows the insert structure to reach a reduced circumferential or perimetrical dimension permitting and facilitating its insertion concentrically within the wheel hub of the vehicle. For certain model of wheels, the reduced circumferential or perimetrical dimension may be smaller than the dimension of the wheel hub opening. The present embodiment is further advantageous in that the reduction of the circumferential or perimetrical dimension of the insert structure is also proportional to the angle formed between the upper part and the lower part resulting in the increase of the adaptability of the insert structure to a wider range of sizes, models and dimensions of wheels on which the device of the present invention may be inserted and secured. It will be furthermore appreciated that, in the closed position, the angle formed by the upper part of the insert structure with the lower part of the insert structure may be approximately or equal to 0° and in the open position such angle may be approximately or equal to 145°, most preferably approximately or equal to 90°. Therefore, the angle herein described may range from 0° to 145°, most preferably from 0° to 90°.

Thus, in the closed position, the upper part may be arranged in a first plane whereas the lower part may be arranged in a second plane, parallel to the first plane. Upon transfer from the closed position to the open position around the axial joint, the angel formed between the upper and lower parts of the insert structure may be the angle between the first and second planes.

Consequently, the rotational axis of the axial joint may be arranged in the second plane or in a plane parallel to the second plane. As an example, the axial joint may comprise a hinge having a hinge pin, and such a hinge pin may be arranged in the second plane or in a plane parallel to the second plane.

According to an embodiment, the upper part and the lower part of the insert structure may comprise a first through hole and a second through hole respectively and the first and second through holes may be adapted to receive the center bolt. Thus, the upper part comprises the first through hole whereas the lower part comprises the second through hole.

As an example, the upper part may form a first ring-shaped structure arranged in the first plane and around the first through hole, whereas the lower part may form a second ring-shaped structure arranged in the second plane and around the second through hole.

The first and second through holes may be concentric when the insert structure is in the closed position. Said through holes may also be concentric with the axis of rotation of the wheel when the insert structure is in the closed position and securely inserted in said wheel. Moreover, the inferior surface of the upper part of the insert structure and the superior surface of the lower part of the insert structure may define the circumference of the first and second through holes respectively, such that the abutment of said surfaces when the insert structure is in the closed position ensures concentricity of the first and second through holes. The present embodiment is further advantageous in that, in the closed position, the first through hole allows the center bolt to pass therethrough and to be secured to the thread formed in the material of the inner surface of the second through hole located on the lower part of the insert structure. Furthermore, the present embodiment is advantageous in that receiving the center bolt through the first and second through hole allows for any rotation of the upper part relative to the lower part about the axial joint to be completely restricted thus resulting in a secure fixation of the device to the wheel of the vehicle.

According to an embodiment, the first through hole of the upper part and the second through hole of the lower part may be concentric when the insert structure is in the closed position and the diameter of first through hole may be larger than the diameter of the second through hole. As mentioned previously, the closed position of the insert structure allows the first and second through holes to be concentric together as well as concentric with the axis of rotation of the wheel on which the present device is installed. The present embodiment is advantageous in that the larger diameter of the first through hole allows for the lower part of the insert structure to comprise more material resulting in a stronger and more secure thread of the inner wall of the second through hole in turn resulting in a stronger connection with the corresponding thread of the center bolt thus permitting an increase of the strength of fixation of the device to the wheel of the vehicle. The present embodiment is further advantageous in that it allows sufficient material and therefore sufficient space for the axial joint to be positioned offset from the diameter of the second through hole.

According to an embodiment, the lower part of the insert structure may comprise a first guard and the upper part of the insert structure may comprise a second guard such that the first guard partially surrounds the upper part and the second guard partially surrounds the lower part when the insert structure is in the closed position. The present embodiment is advantageous in that it allows for the reduction of material required form the insert structure therefore the reduction of the weight of said insert structure by having the upper part and the lower part engage one another as opposed to superimposition. Furthermore, the present embodiment allows for a greater resistance to radial and torsion forces applied on the insert structure thus protecting the axial joint from potentially damaging stresses and strains generated by said forces. The present embodiment is further advantageous in that the first and second guards also ensure that the first and second through holes are concentric when the insert structure is in the closed position.

According to an embodiment, the upper part of the insert structure and the lower part of the insert structure may comprise a first wedge and a second wedge respectively. The present embodiment is advantageous in that the first and second wedges represent the components allowing the insert structure to be securely fixed within the wheel hub of the vehicle. According to another embodiment, the first wedge and the second wedge may be arranged on opposite sides of the concentric diameters of the first through hole and the second through hole of the upper and lower parts of the insert structure. The first and second wedges are positioned such that the insert structure has a flat bottom surface when in the closed position.

According to an embodiment, the first wedge and the second wedge may determine an outer diameter of the insert structure wherein said outer diameter may decrease when the insert structure transfers to the open position. The present embodiment is advantageous in that the rotation of the upper part of the insert structure relative to the lower part of the insert structure about its axial joint consequently allows the first wedge to rotate similarly thus reducing the outer diameter. The reduction of the outer diameter further allows the insert structure to reach a dimension rendering possible and uncomplicated its insertion in the wheel hub. It will be appreciated that the outer diameter determined by the first and second wedges reaches a maximum when the insert structure is in the closed position and a minimum when the insert structure is in the open position and the angle formed between the upper part and the lower part is reaches a maximum.

According to an embodiment, the first wedge and the second wedge of may be configured to secure the insert structure by engaging the wheel of the vehicle when the insert structure is in the closed position. As mentioned above, the outer diameter of the insert structure determined by the first and second wedges reaches its largest dimension when the insert structure is inserted in the wheel and transferred to the closed position allowing said outer diameter to be larger than the dimension of the wheel hub entry through which the insert structure was inserted. The present embodiment is therefore advantageous in that it permits the surfaces of the first and second wedges to exert a force on the inner walls of the wheel hub resulting in a secure fixation of the device in the wheel of the vehicle and increased resistance against forces applied in the axial direction of said wheel. In other words, the force exerted by the first and second wedge on the inner walls of the wheel hub prevents the device from being released from the wheel due to a pulling or pushing force applied on said device.

According to an embodiment, the first wedge and the second wedge may be configured to release the wheel of the vehicle when the insert structure is in the open position. As mentioned in a previous embodiment, the outer diameter of the insert structure determined by the first and second wedges may be reduced by transferring the insert structure to the open position therefore allowing said outer diameter to reach a smaller and adequate dimension permitting the insert structure to be released from the wheel of the vehicle. The present embodiment is further advantageous in that the rotation of upper part of the insert structure relative to the lower part about the axial joint permits at least one of the first and second wedges to cease the exertion of a force on the inner walls of the wheel hub resulting in the release and possible extraction of the insert structure from the wheel of the vehicle.

According to an embodiment, the locking mechanism may comprise a locking protrusion formed in the center bolt, an insert sleeve having a third through hole and being adapted to be rotationally secured to the main module and a detachable locking bolt adapted to be inserted into the main module via the third through hole and the locking protrusion. The locking protrusion and the third though hole may further be configured to be aligned with each other and the locking bolt may be adapted to prevent the center bolt from rotating relative the insert structure. The insert sleeve may comprise recesses and protrusions configured to engage with corresponding recesses and protrusions of the main module. The device may further comprise a locking cap adapted to be rotationally secured to the main module. The locking cap may comprise a fourth through hole adapted to receive a locking bolt, and recesses and protrusions configured to engage with corresponding recesses and protrusions of the insert sleeve. The present embodiments permit the reduction of undesired rotational movement of the center bolt which may lead to the release of the device from the wheel of the vehicle.

According to an embodiment, the detachable locking bolt may comprise a key hole and may be operable by turning a key in the lock and wherein the detachable locking bolt may be configured to be inserted via a front side of the device and secured in the axial direction by engaging the locking protrusion of the center bolt. The present embodiment is advantageous in that it allows for simplicity of use of the device by a user requiring no tooling or assembly instruments other than an assigned key.

BRIEF DESCRIPTION OF THE DRAWINGS

The above, as well as additional objects, features and advantages of the present invention, will be better understood through the following illustrative and non-limiting detailed description of embodiments of the present invention. Reference will be made to the appended drawings, on which.

DETAILED DESCRIPTION OF EMBODIMENTS

Figure 1:
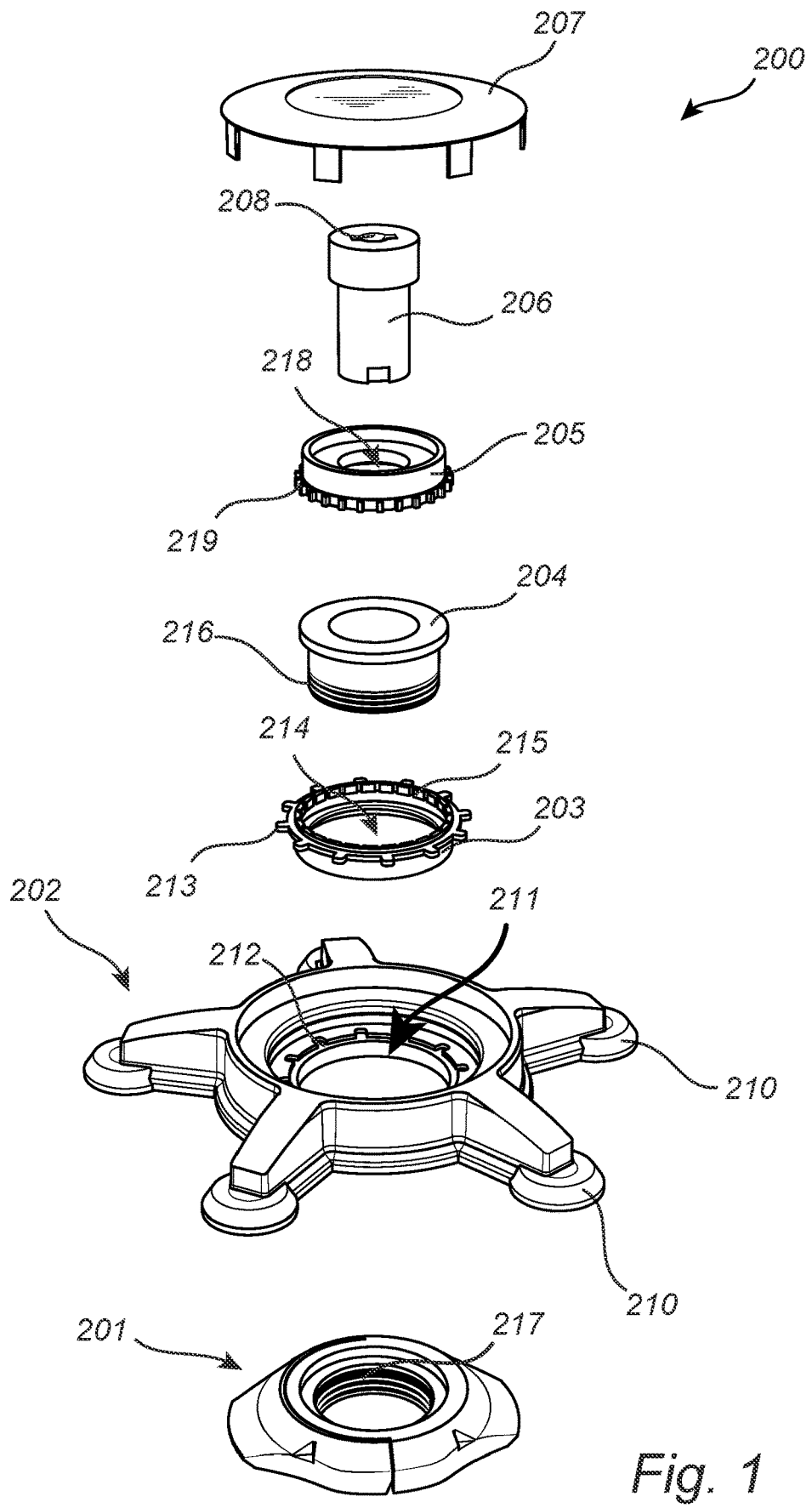
FIG. 1 illustrates an exploded view of a device for locking the wheel of a vehicle comprising all components according to an embodiment.

FIG. 1 illustrates an exploded view of a device 200 for locking the wheel of a vehicle according to an embodiment of the present invention, comprising an insert structure 201 shown in a closed position, a main module 202, an insert sleeve 203, a center bolt 204, a locking cap 205, a detachable locking bolt 206 and a protective cover 207. The device 200 according to the present invention is arranged to be installed on the wheel of a vehicle starting by the insertion of the insert structure 201 within the wheel hub of the wheel to be protected by the device 200. The insert structure 201 may be inserted into the wheel hub in an opened position to further be securely fixed in said wheel hub by being transferred to a closed position. Further details regarding the insert structure 201 will be described in the subsequent figures. FIG. 1 further shows a main module 202 having a plurality of protective elements 210 adapted to restrict, limit or block access to the bolt heads and/or lug nuts of the wheel of the vehicle being protected by the device 200. The protective elements 210 are shown in FIG. 1 as an integral part of the main module 202 and forming a pattern corresponding to the of the position of the bolts/nuts on the wheel. The main module 202 further comprises an opening 211 in its center allowing components to be joined to the insert structure 201 through the main module 202 thus securing the device 200 to the wheel of the vehicle. The main module 202 shown in FIG. 1 further comprises a recess pattern 212 on the circumference of its opening 211 arranged to be engaged by a corresponding outward protrusion pattern 213 comprised on the circumference of the insert sleeve 203. The insert sleeve 203 shown in FIG. 1 further comprises the third through hole 214, as described in a previous embodiment, as well as a recess pattern 215 on the circumference of said third through hole 214. The insert sleeve 203 is meant to engage the main module 202 in its opening 211 and in turn receive the center bolt 204. The center bolt 204 as shown in FIG. 1 comprises a cylindrical body with a hollow center and a bottom threading 216 formed directly in the material of the outer wall of the inferior portion of the center bolt 204. It is to be noted that the center bolt 204 is not limited to having a hollow center and may also comprise a through hole. The center bolt 204 further comprises a locking protrusion on the inner wall of its hollow center (not shown in FIG. 1) adapted to engage and secure the locking mechanism. FIG. 1 further illustrates a locking cap 205 comprising a fourth through hole 218 adapted to receive the detachable locking bolt 206 and comprising an outward protrusion pattern 219 arranged to engage the corresponding recess pattern 215 of the insert sleeve 203. The detachable locking bolt 206 or lock shown in FIG. 1 may comprise a locking recess (not shown) and may be adapted to be inserted into the center bolt 204 and to engage the locking protrusion of said center bolt 204 when a key is rotated in the key hole 208 of the detachable locking bolt 206. FIG. 1 finally shows a protective cover 207 adapted to be attached to the main module 202 e.g. by snapping function and to cover the aforementioned components for further protection of the device 200, more specifically the key hole 208 and the detachable locking bolt 206. The device 200 shown in the exploded view of FIG. 1 may be installed on the wheel of a vehicle by initially inserting the insert structure 201 in the hub of the wheel. The installation further occurs by engaging, via the corresponding recesses and protrusions patterns 212, 213, the insert sleeve 203 in the main module 202. The center bolt 204 may then be inserted through the third through hole 214 and through the opening 211 of the main module 202 and rotatably secured by means of its bottom thread 216 to the corresponding thread 217 of the insert structure 201. The detachable locking bolt 206 may then be inserted in the center bolt 204 via the fourth through hole 218 of the locking cap 205 which in turn may be secured in to the insert sleeve 203 by engagement of the corresponding recesses and protrusions patterns 215, 219. When installed on the wheel of a vehicle, all components of the device 200 shown in FIG. 1 are aligned with the axis of rotation of the wheel thus rendering all openings and through holes concentric. The device 200 is therefore secured to the wheel of a vehicle by means of threading 216, 217, securing the center bolt 204 to the insert structure 201 which in turn secures the device 200 and its components to the wheel. When the detachable locking bolt 206 engages the locking recess of the center bolt 204 following turning a key in the key hole 208, the center bolt is restricted from any rotational movement which would release it from the insert structure 201. The un-installment of the device 200 may be done by removing the detachable locking bolt 206 and rotating the center bolt 204 out of the insert structure 201 therefore releasing the main module 202 and other components from the wheel of the vehicle.

Figure 2A:
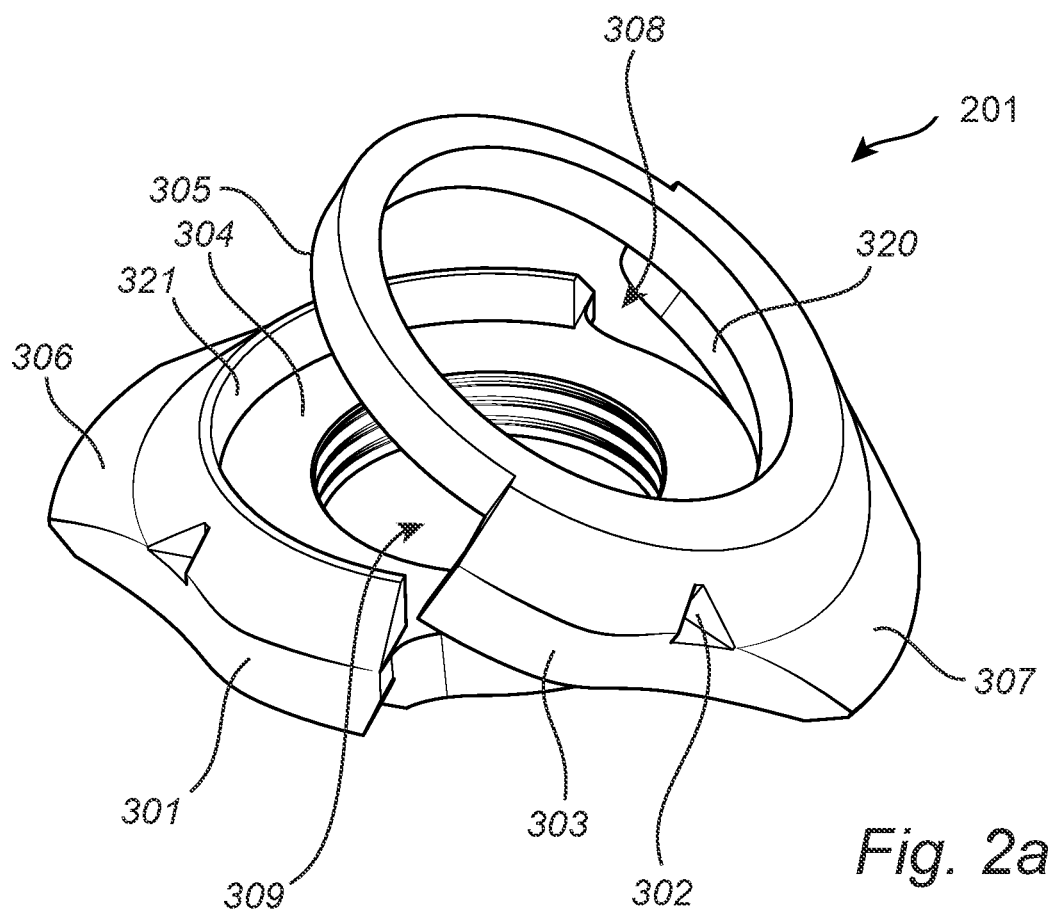
FIG. 2a illustrates a perspective view of the insert structure in an opened position according to an embodiment.
Figure 2B:
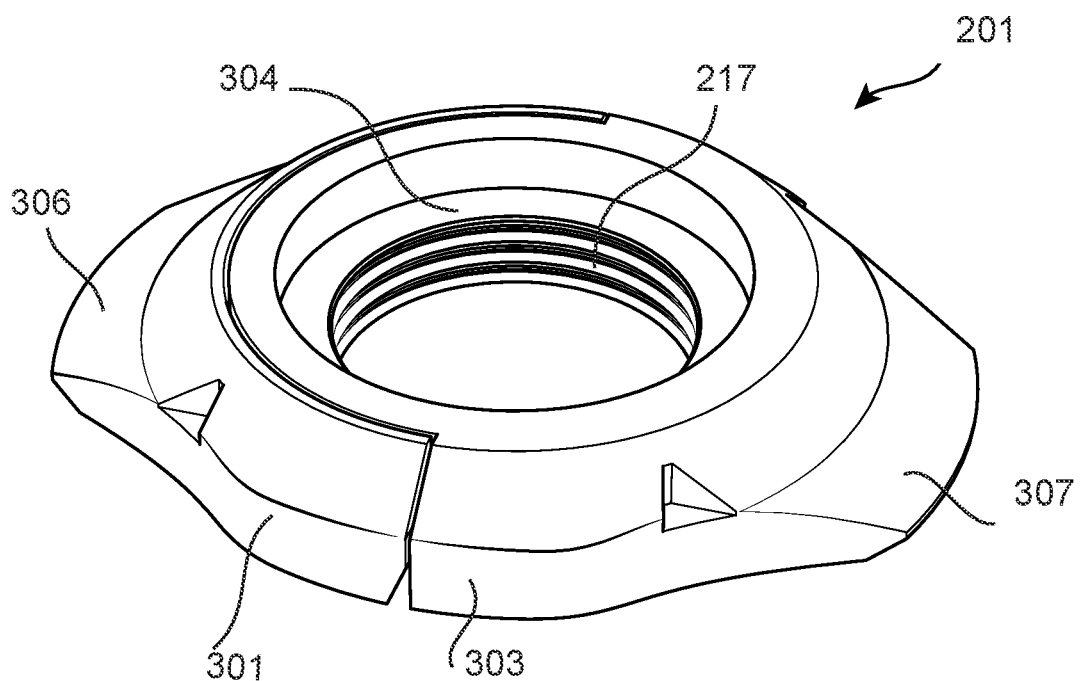
FIG. 2b illustrates a perspective view of the insert structure in a closed position according to an embodiment.

FIGS. 2a and 2b illustrate a perspective view of the insert structure 201 in an opened position (FIG. 2a) and an insert structure 201 in a closed position FIG. 2b) according to embodiments of the present invention. The insert structure 201 illustrated in FIG. 2a is shown in an opened position and comprises an upper part 303 and a lower part 301 rotatably joined together by an axial joint 302 (hidden by the structure of the upper part 303 in FIG. 2a, but illustrated more clearly in FIGS. 5 and 6) being positioned offset from the second through hole 309 and allowing the upper part 303 to rotate freely relative to the lower part 301 about the axis of said axial joint 302. The upper part 303 of the insert structure 201 shown in FIG. 2a further comprises a first through hole 308 and an inferior surface 305 represented by the bottom circumferential surface of said first through hole 308. FIG. 2a further shows the second through hole 309 comprised in the lower part 301 as well as a superior surface 304 represented by the top circumferential surface of the second through hole 309. The lower part 301 and the upper part 303 respectively comprise a first guard 321 and a second guard 320 arranged to partially surround the upper part 303 and the lower part 301 respectively. FIG. 2a further illustrates a first wedge 307 comprised on the upper part 303 of the insert structure 201 and a second wedge 306 comprised on the lower part 301 of the insert structure 201. The first and second wedges 307, 306 form an integral part of the upper and lower parts 303, 301 of the insert structure 201 and are positioned opposite to one another around the diameters of the through holes 308, 309. The insert structure 201 shown in FIG. 2a in the opened position further illustrates the upper part 303 forming an angle with the lower part 301 when said upper part 303 is rotated relative to the lower part 301 about the axis of rotation of the axial joint 302. Regarding FIG. 2b there is shown an insert structure 201 in the closed position. FIG. 2b shows the upper part 303 engaging the lower part 301 such that the inferior surface of the upper part 303 abuts the superior surface 304 of the lower part 311 of the insert structure 201 therefore limiting the rotation of the upper part 303 towards the lower part 311. FIG. 2b further illustrates the function of the first and second guards containing the upper and lower parts 303, 301 respectively as to prevent damages induced to the insert structure 201 by radial and torsion forces. The insert structure 201 further comprises a thread 217 in the material of the inner wall of the second through hole of the lower part 301, arranged to receive the corresponding bottom thread of the center bolt (described in FIG. 1) such that said center bolt may be securely fixed to the insert structure 201. FIG. 2b further shows the larger diameter of the first though hole relative to the second through hole and consequently the larger superior surface 304 of the lower part 301. The insert structure 201 illustrated in FIG. 2b further comprises a first and a second wedge 306, 307 which extremities determine the outer diameter of the insert structure 201. The insert structure 201 of FIG. 2b shown in the closed position illustrates the first through hole of the upper part 303 positioned concentrically with the second through hole of the lower part 301.

Figure 3A:
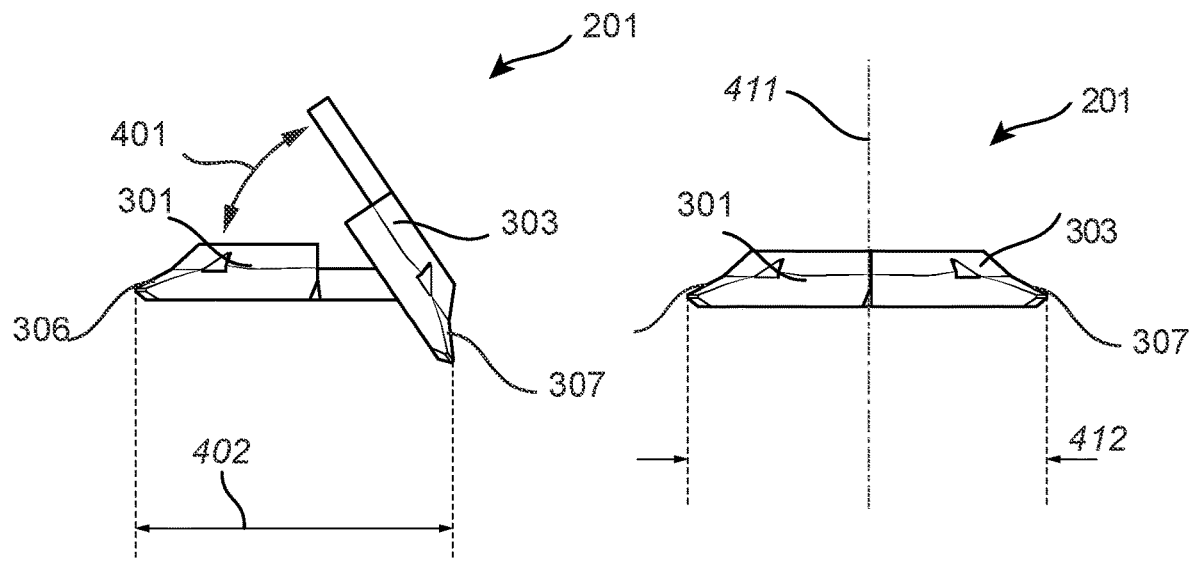
FIG. 3a illustrates a side view of the insert structure in both an opened and a closed position according to an embodiment.
Figure 3B:
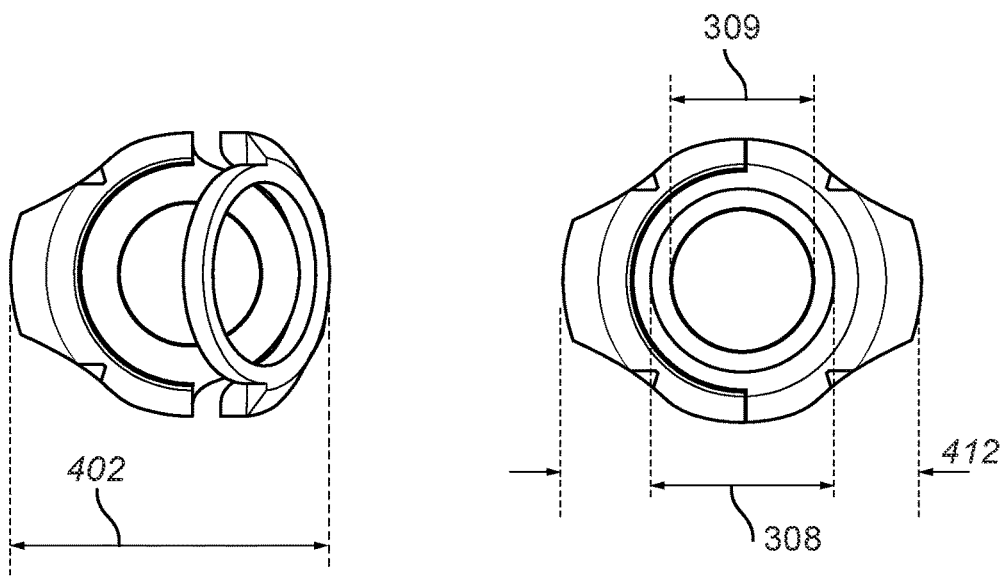
FIG. 3b illustrates a top view of the insert structure in both an opened and a closed position according to an embodiment.

FIGS. 3a and 3b illustrate a side view and a top view of the insert structure in both an opened and a closed position according to an embodiment of the present invention. With regards to FIG. 3a, there is shown a side view of an insert structure 201 in an opened position (illustration on left hand side) and an insert structure 201 in a closed position (illustration on right hand side) 410. The opened insert structure 201 illustrates an angle 401 formed by the upper part 303 with the lower part 301 when said upper part 303 is rotated relative to the lower part 301 about the axial joint. The angle 401 may reach a maximum of 145° at full rotation of the upper part 303 when the insert structure 201 is in the opened position. The rotation of the upper part 303 relative to the lower part 301 when the insert structure is transferred to the open position may be limited by the contact or abutment of a first rotation limiting surface of the upper part 303 with a second rotation limiting surface of the lower part 301 of the insert structure 201 (not shown). FIG. 3a further shows the reduced outer diameter 402 of the opened insert structure 201 determined by the extremities of the first and second wedges 306, 307. Regarding the insert structure 201 presented in a closed position in FIG. 3a, there is shown the concentricity of the first and second through holes of the upper part 303 and the lower part 301 about the axis 411. When installed in the wheel of a vehicle, the concentric axis 411 may represents the axis of rotation of the wheel. Furthermore, the closed insert structure 201 shows no rotation of the upper part 303 relative to the lower part 301 about the axial joint, therefore forming no angle (0°) between the inferior surface of the upper part 303 and the superior surface of the lower part 301. FIG. 3a further shows the maximum outer diameter 412 reached by the insert structure 201 in a closed position 410. The reduced outer diameter 402 is therefore shown as smaller than the maximum outer diameter 412 in FIG. 3a. Regarding FIG. 3b, there is shown the equivalent top view of the opened insert structure and closed insert structure 201 illustrated in FIG. 3a. The dimensional difference between the reduced outer diameter 402 and the maximum outer diameter 412 is further observable in FIG. 3b. The concentricity of the first and second through holes as well as the difference between the diameter of the first through hole 308 and the diameter of the second through hole 309 is further evident in the top view of the closed insert structure presented in FIG. 3b.

Figure 4A:
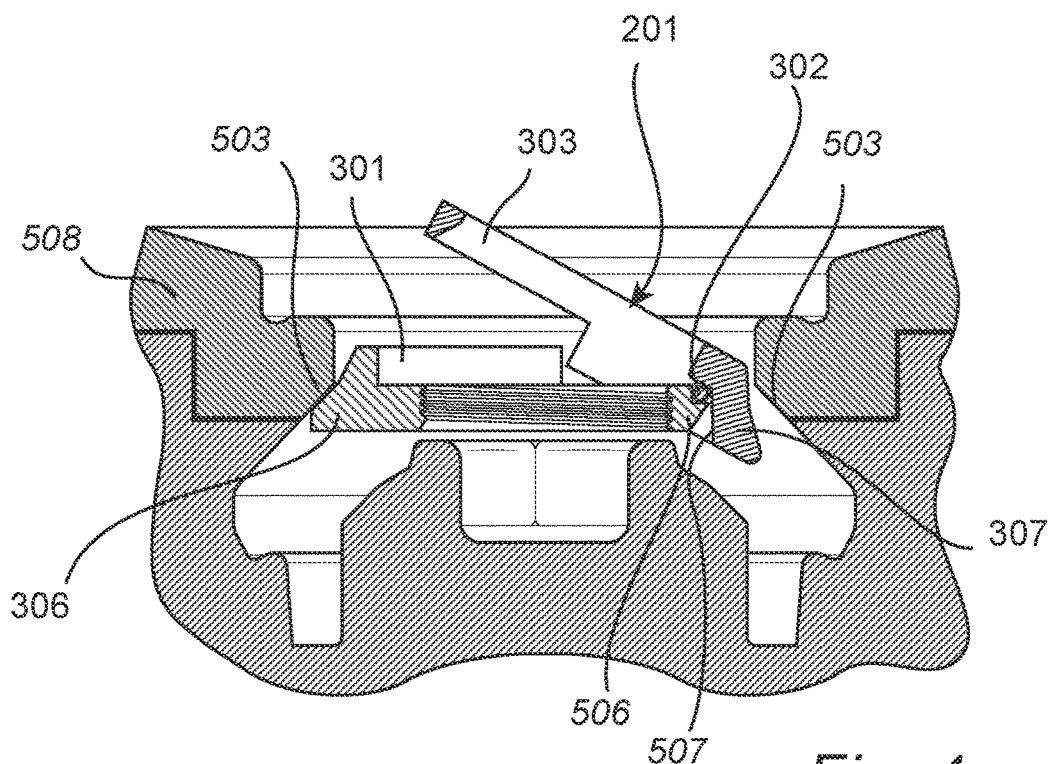
FIG. 4a illustrates the insert structure in an opened position inserted in the wheel hub according to an embodiment.
Figure 4B:
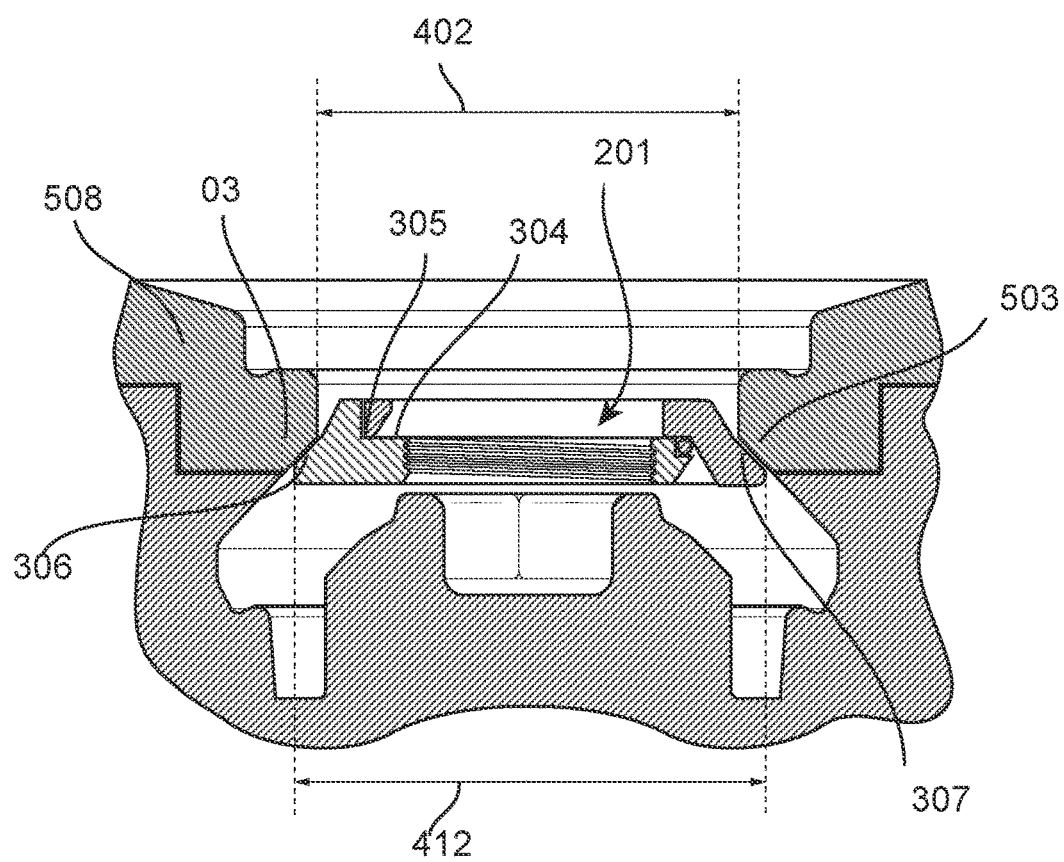
FIG. 4b illustrates the insert structure in a closed position securely fixated in the wheel hub according to an embodiment.

FIG. 4a illustrates the insert structure in an opened position inserted in the wheel hub according to an embodiment of the present invention. The insert structure 201 is shown in the opened position well inserted in the wheel hub 508 and aligned with the axis of rotation of the wheel such that the second through hole of the lower part 301 of the insert structure 201 may be concentric with said axis of rotation of the wheel. FIG. 4a further illustrates the first wedges 306 being abutted on the inner wall surface 503 of the wheel hub 508 whereas the second wedge 307 is shown free of contact as the upper part 303 is rotating about the axial joint 302 towards the closed position. It is to be noted that the insert structure 201 is shown in FIG. 4a with an outer diameter slightly larger than the diameter of the wheel hub 508 which may e.g. require for the insert structure 201 to be inserted in the wheel hub 508 at an angle and then aligned with the axis of rotation of the wheel. The insert structure 201 in the opened position shown in FIG. 4a may therefore be released from the wheel hub 508 if kept in the opened position. FIG. 4a further illustrates the first rotation limiting surface 507 of the upper part 303 and the second rotation limiting surface 506 of the lower part 301 limiting the maximum rotation of the upper part 303 relative to the lower part 301 when abutted together. Correspondingly, FIG. 4b illustrates the insert structure 201 in a closed position securely fixed in the wheel hub 508 according to an embodiment of the present invention. The closed insert structure 201 is shown in FIG. 4b aligned with the axis of rotation of the wheel such that the first and second through holes of the upper and lower parts of the insert structure 201 may be concentric together and with said axis of rotation of the wheel. FIG. 4b further illustrates the maximum outer diameter 412 reached by the insert structure 201 in the closed position being significantly larger than the diameter 402 of the wheel hub 508 allowing the first and second wedges 307, 306 to enter in contact with and exert a force on the inner walls 503 of the wheel hub 508 resulting in a secure fixation of the insert structure 201 in the wheel hub 508 and resistance against forces applied on the insert structure 201 in the axial direction of the wheel of the vehicle. FIG. 4b further depicts the abutment of the inferior surface 305 of the upper part of the insert structure 201 with the superior surface 304 of the lower part of the insert structure.

Figure 5:
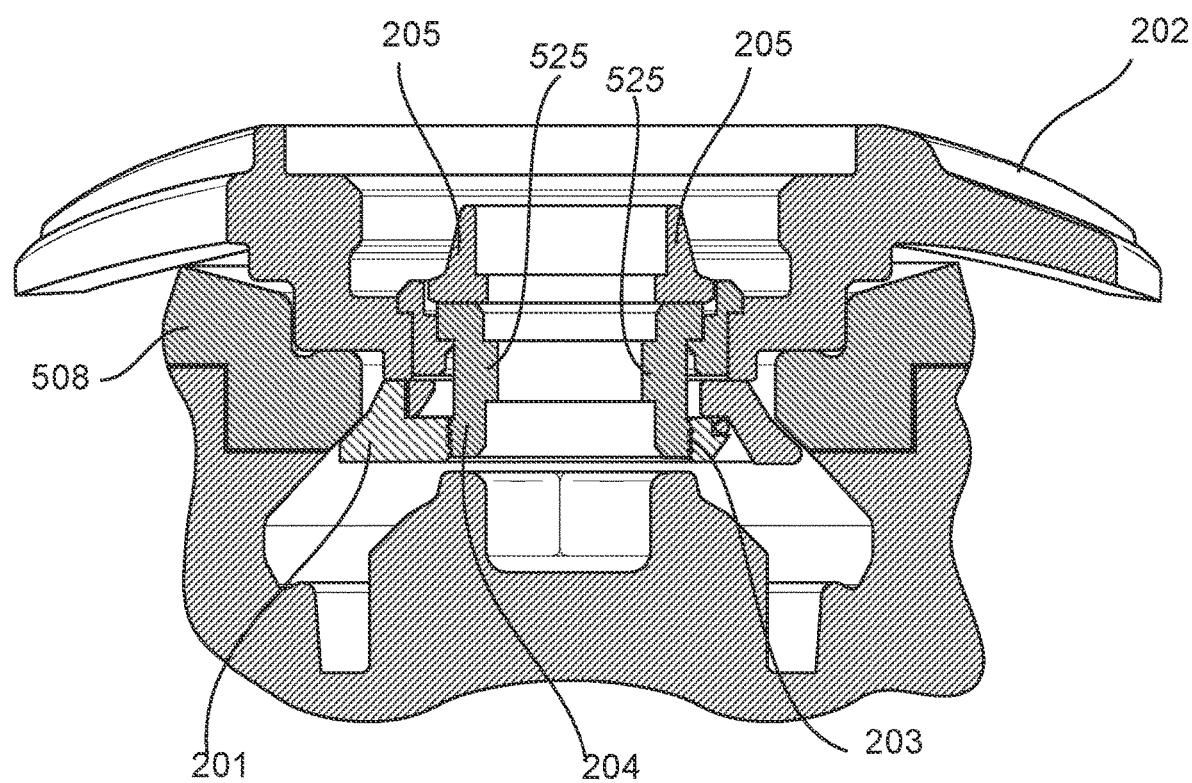
FIG. 5 illustrates a sectional view of a wheel of a vehicle in which components of the device are installed according to an embodiment.

FIG. 5 illustrates a sectional view of a wheel of a vehicle in which components of the device are installed according to an embodiment of the present invention. The insert structure 201 is shown in FIG. 5 in the closed position and securely fixed in the wheel hub 508 such that its first and second wedges exert a force on the inner walls of said wheel hub 508. FIG. 5 further shows the center bolt 204 joined by corresponding threads to the lower part of the insert structure 201 through the first and second through holes of said insert structure 201. The center bolt 204 is further shown inserted through the third through hole of the insert sleeve 203 which in turn securely engages the main module 202 via corresponding recesses and protrusions patterns described in FIG. 1. Therefore, the center bolt 204 securely attaches the main module 202 and the insert sleeve 203 to the insert structure 201 thus enabling the protective elements to limit or block access to the bolt heads and/or lug nuts of the wheel of the vehicle. FIG. 5 further depicts a locking cap 205 securely fixed to the insert sleeve 203 by engagement of the corresponding recesses and protrusions patterns, also described in FIG. 1, and superimposed over the center bolt 204 as to restrict or limit access to the center bolt 204 as well as to limit the rotation of said center bolt 204 which may result in its release from the insert structure 201. FIG. 5 further illustrates a locking protrusion 525 positioned on the inner wall of the hollow center of the center bolt 204 arranged to engage the components of the locking mechanism (not shown).

Figure 6:
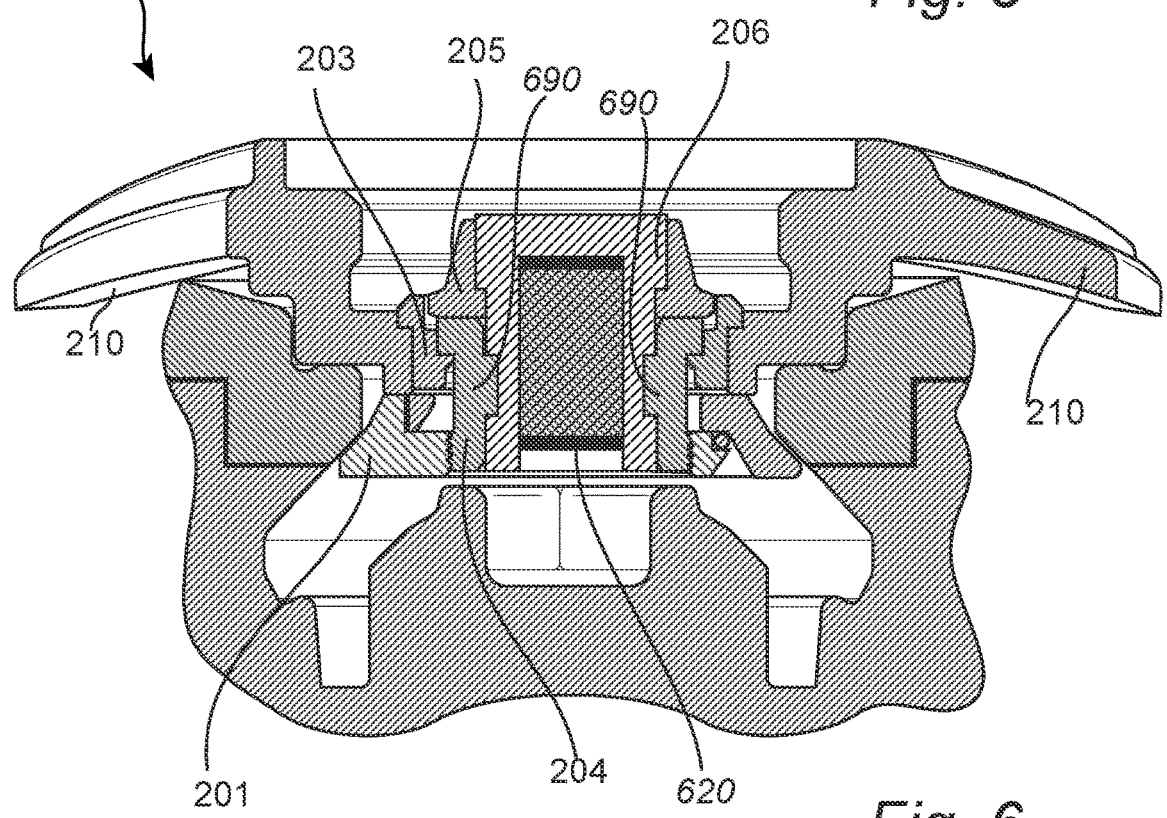
FIG. 6 illustrates a sectional view of a wheel of a vehicle in which the locking mechanism is installed in the wheel of the vehicle according to an embodiment.

FIG. 6 illustrates a sectional view of a wheel of a vehicle in which the locking mechanism is installed in the wheel of the vehicle according to an embodiment of the present invention. Similarly to the description of FIG. 5, FIG. 6 shows an insert structure 201 in the closed position and securely fixed in the wheel hub such that its first and second wedges exert a force on the inner walls of said wheel hub as well as a center bolt 204, an insert sleeve 203, a main module 202, protective elements 210 and a locking cap 205 according to the description of their homologous components of FIG. 5. FIG. 6 further illustrates a detachable locking bolt 206, comprising a key hole (not shown), inserted through the fourth through hole of the locking cap 205 into the center bolt 204. The detachable locking bolt 206 shown in FIG. 6 further comprises a locking recess 620 permitting such insertion of the detachable locking bolt 206 in the hollow center of center bolt 204 when said locking mechanism is in the open state. Therefore, upon rotation of the detachable locking bolt 206 i.e. upon transfer of the locking mechanism to the locking state, the locking recess 620 engages the locking protrusion 690 of the center bolt 204 restricting access or rotation of the components of the device of the present invention thus securely locking said device onto the wheel of the vehicle.

The device may be manufactured from various types of materials; however, aluminum and steel are the preferred materials.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

What is claimed is:

1. A device for locking the wheel of a vehicle, comprising:
   a main module adapted to be attached to the wheel, and configured to cover nuts or bolts for attaching the wheel to the vehicle;
   an insert structure comprising an upper part and a lower part, wherein the upper part is rotatably joined to the lower part by an axial joint, wherein the insert structure is transferable from an open position to a closed position upon rotation of said upper part around said axial joint; wherein the insert structure in said open position is adapted for insertion in the wheel concentrically to the axis of rotation of the wheel and wherein the insert structure in said closed position is adapted for fixating the insert structure in said wheel upon transfer to the closed position after insertion in the wheel,
   a center bolt adapted to be connected through the main module to the lower part of the insert structure by threading, and
   a locking mechanism comprising at least a detachable locking bolt adapted to be arranged in a locking state in which the locking mechanism prevents the center bolt from rotating relative the main module, and in an open state in which the locking mechanism allows the center bolt to rotate relative the main module.

2. The device according to claim 1, wherein the upper part comprises an inferior surface and the lower part comprises a superior surface such that the inferior surface abuts the superior surface when the insert structure is in the closed position.

3. The device according to claim 1, wherein the upper part of the insert structure forms an angle with the lower part of the insert structure when in the open position.

4. The device according to claim 1, wherein the upper part and the lower part of the insert structure comprise a first through hole and a second through hole respectively and wherein the first and second through holes are adapted to receive the center bolt.

5. The device according to claim 4, wherein the first through hole of the upper part and the second through hole of the lower part are concentric when the insert structure is in the closed position and wherein the diameter of the first through hole is larger than the diameter of the second through hole.

6. The device according to claim 1, wherein the lower part comprises a first guard and the upper part comprises a second guard such that the first guard partially surrounds the upper part and the second guard partially surrounds the lower part when the insert structure is in the closed position.

7. The device according to claim 1, wherein the upper part of the insert structure and the lower part of the insert structure comprise a first wedge and a second wedge, respectively.

8. The device according to claim 7, wherein the first wedge and the second wedge are arranged on opposite sides of the concentric diameters of the first through hole and the second through hole of the upper and lower parts of the insert structure.

9. The device according to claim 7, wherein the first wedge and the second wedge determine an outer diameter of the insert structure and wherein said outer diameter decreases when the insert structure transfers to the open position.

10. The device according to claim 7, wherein the first wedge and the second wedge are configured to secure the insert structure by engaging the wheel of the vehicle when the insert structure is in the closed position.

11. The device according to claim 7, wherein the first wedge and the second wedge are configured to release the wheel of the vehicle when the insert structure is in the open position.

12. The device according to claim 1, wherein the locking mechanism comprises:
    a locking protrusion formed in the center bolt;
    an insert sleeve having a third through hole and being adapted to be rotationally secured to the main module; and
    a detachable locking bolt adapted to be inserted into the main module via the third through hole and the locking protrusion;
    wherein the locking protrusion and the third though hole are configured to be aligned with each other; and
    the locking bolt is adapted to prevent the center bolt from rotating relative the insert structure.

13. The device according to claim 12, wherein the insert sleeve comprises recesses and protrusions configured to engage with corresponding recesses and protrusions of the main module.

14. The device according to claim 12, further comprising a locking cap adapted to be rotationally secured to the main module, the locking cap comprising a fourth through hole adapted to receive the detachable locking bolt, and recesses and protrusions configured to engage with corresponding recesses and protrusions of the insert sleeve.

15. The device according to claim 14, wherein the detachable locking bolt comprises a key hole and is operable by turning a key in the lock and wherein the detachable locking bolt is configured to be inserted via a front side of the device and secured in the axial direction by engaging the locking protrusion of the center bolt.

\* \* \* \* \*